United States Patent
Reid et al.

(10) Patent No.: US 8,499,839 B2
(45) Date of Patent: Aug. 6, 2013

(54) CONNECTION DEVICE

(75) Inventors: Iain Reid, Bristol (GB); Paul Charles Roberts, Bristol (GB); Alistair Ross Donald, Somerset (GB)

(73) Assignee: Viper Subsea Limited (GB)

( * ) Notice: Subject to any disclaimer, the term of this patent is extended or adjusted under 35 U.S.C. 154(b) by 387 days.

(21) Appl. No.: 12/657,374

(22) Filed: Jan. 19, 2010

(65) Prior Publication Data
US 2010/0186964 A1 Jul. 29, 2010

(30) Foreign Application Priority Data

Jan. 23, 2009 (GB) .................................. 0901098.4
Jul. 21, 2009 (GB) .................................. 0912611.1

(51) Int. Cl.
*E21B 23/00* (2006.01)

(52) U.S. Cl.
USPC ........... 166/341; 166/338; 166/360; 166/365; 166/378; 285/401

(58) Field of Classification Search
USPC ................. 166/367, 338–341, 344, 351, 360, 166/365, 378; 285/399, 401, 402
See application file for complete search history.

(56) References Cited

U.S. PATENT DOCUMENTS

| | | | | |
|---|---|---|---|---|
| 5,024,467 A * | 6/1991 | Truchet | ........................ | 285/365 |
| 5,265,980 A * | 11/1993 | Lugo et al. | .................... | 405/169 |
| 5,417,459 A * | 5/1995 | Gray et al. | ...................... | 285/26 |
| 5,794,701 A * | 8/1998 | Cunningham et al. | ........ | 166/341 |
| 7,172,447 B2 * | 2/2007 | Allensworth et al. | ........ | 439/271 |
| 7,380,835 B2 * | 6/2008 | McCoy et al. | .................. | 285/24 |
| 7,467,662 B2 * | 12/2008 | Smith | .......................... | 166/343 |
| 7,641,487 B2 * | 1/2010 | Morgan | ....................... | 439/158 |
| 8,011,434 B2 * | 9/2011 | Cosgrove et al. | ............ | 166/341 |
| 8,020,623 B2 * | 9/2011 | Parks et al. | .................... | 166/341 |
| 2001/0034153 A1 * | 10/2001 | McIntosh et al. | ............ | 439/364 |
| 2004/0127084 A1 * | 7/2004 | Glennie et al. | ................ | 439/316 |
| 2006/0079107 A1 * | 4/2006 | Allensworth et al. | ........ | 439/271 |
| 2008/0143100 A1 * | 6/2008 | Webster | ......................... | 285/18 |
| 2008/0202760 A1 * | 8/2008 | Cosgrove et al. | ............ | 166/341 |

FOREIGN PATENT DOCUMENTS

| | | |
|---|---|---|
| GB | 2231642 A | 11/1990 |
| GB | 2361274 A | 10/2001 |
| GB | 2408299 A | 5/2005 |

(Continued)

OTHER PUBLICATIONS

"Great Britain Application Serial No. GB0901098.4, Search Report dated May 20, 2009", 1 pg.
"Great Britain Application Serial No. GB0912611.1, Search Report dated Mar. 25, 2010", 1 pg.

(Continued)

*Primary Examiner* — Matthew Buck
(74) *Attorney, Agent, or Firm* — Schwegman Lundberg & Woessner, P.A.

(57) ABSTRACT

A connection device comprises a lock component of non-circular cross-sectional shape, the lock component being both angularly and axially moveable relative to a housing, stop means operable to limit angular movement of the lock component relative to the housing, the lock component having a threaded drive region, and a drive nut in threaded engagement with the drive region, wherein angular movement of the drive nut relative to the housing when the stop means are not engaged is able to drive the lock component for angular movement, rotation of the drive nut when the stop means are engaged causing axial displacement of the lock component relative to the housing.

14 Claims, 6 Drawing Sheets

FOREIGN PATENT DOCUMENTS

| | | | |
|---|---|---|---|
| GB | 2425565 | A | 11/2006 |
| GB | 2442104 | A | 3/2008 |
| WO | WO-03/023184 | A1 | 3/2003 |

OTHER PUBLICATIONS

"European Application Serial No. 09252841.3, Search Report dated Sep. 13, 2011", 5 pgs.

* cited by examiner

CONNECTION DEVICE

RELATED APPLICATION

This application claims priority under 35 U.S.C. 119 to United Kingdom Application No. 0901098.4, filed Jan. 23, 2009; and United Kingdom Application No. 0912611.1, filed Jul. 21, 2009, which applications are incorporated herein by reference and made a part hereof.

This invention relates to a connection device and in particular to a connection device intended for use in subsea environments, for example for use in securing a flying or moveable stabplate or other connector to a fixed stabplate or connector.

It is well known to use so-called stabplates in the connection of, for example, hydraulic or chemical hoses or electrical power or control lines to subsea located equipment. Each stabplate has a number of hoses and/or cables secured thereto and serves to allow each of the hoses and/or cables to be connected to the subsea located equipment simultaneously in a single operation, rather than requiring the individual connection of each hose or cable to a subsea located connector. As a result, the connection procedure is relatively simple.

In order to ensure the correct connection of each of the hoses and/or cables, the moveable or flying stabplate is provided with one or more location features which must be aligned with corresponding features provided on the fixed stabplate before the stabplates are secured to one another. Once properly aligned, the stabplates must be securely attached to one another to resist hydraulically generated separation forces and to prevent accidental separation of the stabplates from one another.

Several techniques are known for securing stabplates to one another. One relatively simple design makes use of an Acme screw threaded coupling between the stabplates which is tightened to secure the stabplates to one another when they are correctly aligned. Although such a technique is relatively simple, it has the disadvantage that corrosion and/or calcareous deposits and/or marine growth can result in the threaded coupling becoming jammed, preventing separation or reconnection of the stabplates.

A more complex coupling technique is described in US2008/0202760 and comprises an angularly moveable lock component of non-circular, cruciform shape and a cam and follower drive arrangement operable to drive the lock component for angular movement. In use, the lock component is introduced through a correspondingly shaped opening in the fixed stabplate. The lock component is then driven, by the cam and follower arrangement, to an angular orientation in which it will not pass through the opening. Once this orientation has been reached, the lock component is partially retracted into or towards the moveable or flying stabplate to clamp the stabplates together. Although this technique allows the stabplates to be secured to one another, and is less susceptible to calcareous deposits or marine growth than an Acme threaded coupling arrangement, it has the disadvantage that it requires the provision of several high tolerance moving parts, and tends to be of relatively large dimensions as a result of the need to convert axial motion into angular movement. The large dimensions result in the stabplate with which the coupling is associated being relatively heavy and difficult to manipulate, either by a diver or when using a Remotely Operated Vehicle (ROV).

In order to permit release of the stabplates in the event of a failure in the connection device, it is known to provide a secondary release mechanism. The secondary release mechanism typically relies upon shearing of at least one component thereof to achieve release. Such designs have the disadvantage that shearing may occur at times other than when desired. As this could lead to unexpected separation of the stabplates in an uncontrolled manner, the use of such a secondary disconnection mechanism is not desirable.

It is an object of the invention to provide a connection device suitable for use in such applications which is of relatively simple and convenient form. An additional object of the invention is to provide a connection device incorporating additional release means operable to permit release in the event of a failure in the connection device, the additional release means not being reliant upon shearing of a component.

According to the present invention there is provided a connection device comprising a lock component having at least a part of non-circular cross-sectional shape, the lock component being both angularly and axially moveable relative to a housing, stop means operable to limit angular movement of the lock component relative to the housing, the lock component having a threaded drive region, and a drive nut in threaded engagement with the drive region, wherein angular movement of the drive nut relative to the housing when the stop means are not engaged is able to drive the lock component for angular movement, rotation of the drive nut when the stop means are engaged causing axial displacement of the lock component relative to the housing. A rotary drive means, for example in the form of a standard torque receptacle such as a torque bucket, may be provided.

By using the threaded engagement between the drive nut and the drive region to cause both angular and axial movement of the lock component, when required, it will be appreciated that the connection device is of simple and compact form.

Preferably, indicator means are provided to indicate the angular position of the lock component relative to the housing.

A secondary release mechanism may be provided to permit release of the connection device in the event of a failure or jam. The secondary release mechanism may comprise drive means operable to permit angular movement of the lock component to permit release of the connection device.

A tertiary release mechanism may also be provided. The tertiary release mechanism may be operable to permit angular movement of the housing of the connection device relative to the stabplate. This causes rotation of the lock component to enable release from the fixed stabplate. The tertiary release mechanism preferably comprises a removable lock member, removal of which permits relative movement to take place between the housing and the stabplate.

It will be appreciated that neither the second nor the third release mechanism is reliant upon the shearing of a component to permit release, thus the disadvantages set out hereinbefore are overcome.

The invention also relates to a stabplate arrangement comprising a first stabplate having a non-circular socket associated therewith, and a second stabplate having a connection device as defined hereinbefore associated therewith, the lock component of the connection device being able to pass through or into the socket in a first angular orientation, angular movement of the lock component to a second angular orientation preventing such movement.

Alignment means are preferably provided to ensure the correct alignment of the stabplates, in use. The alignment means may comprise a radial projection associated with one of the stabplates receivable within a corresponding keyway associated with the other of the stabplates. Alternatively or additionally, the alignment means may comprise a pin which extends in a direction parallel to the axis of one of the stabplates receivable within a corresponding opening formed in the other of the stabplates.

Separation means may also be provided. For example, the separation means may comprise a surface of the lock component engageable with an outer surface of the first stabplate, release of the connection device forcing the said surface of the lock component against the first stabplate and urging the stabplates apart.

The invention will further be described, by way of example, with reference to the accompanying drawings, in which.

Figure 1:
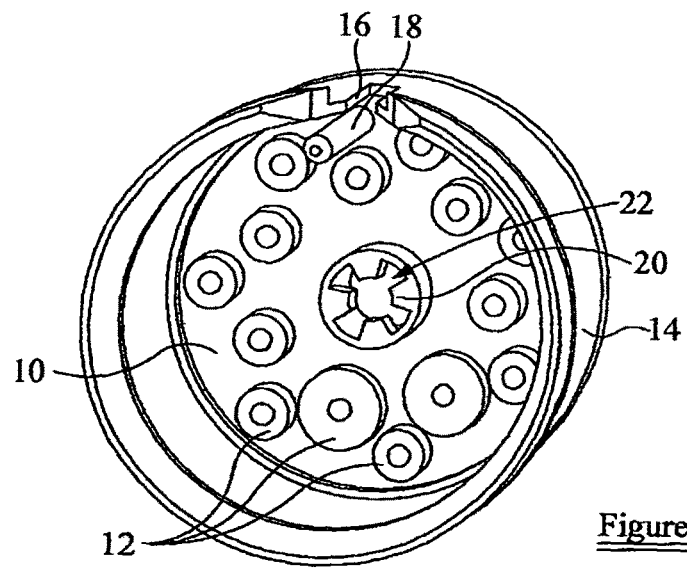
FIG. 1 is a diagrammatic view of a fixed stabplate.

The fixed stabplate illustrated in FIG. 1 comprises a plate 10 of generally circular shape and upon which are provided a number of connectors 12. Around the periphery of the plate 10 is formed a guidance funnel 14, part of which is of tapering form, operable in use to assist in the guiding of a flying stabplate into proper alignment with the fixed stabplate. The guidance funnel 14 is formed with a tapering keyway slot 16, and projecting from the plate 10 is an alignment pin 18.

Formed centrally on the plate 10 is an upstanding boss 20 in which is formed an opening or socket 22 of non-circular cross section. In the arrangement illustrated, the opening 22 is of generally cruciform shape, but it will be appreciated that other non-circular shapes are possible, and the invention is not restricted to the specific arrangement illustrated.

Figure 2:
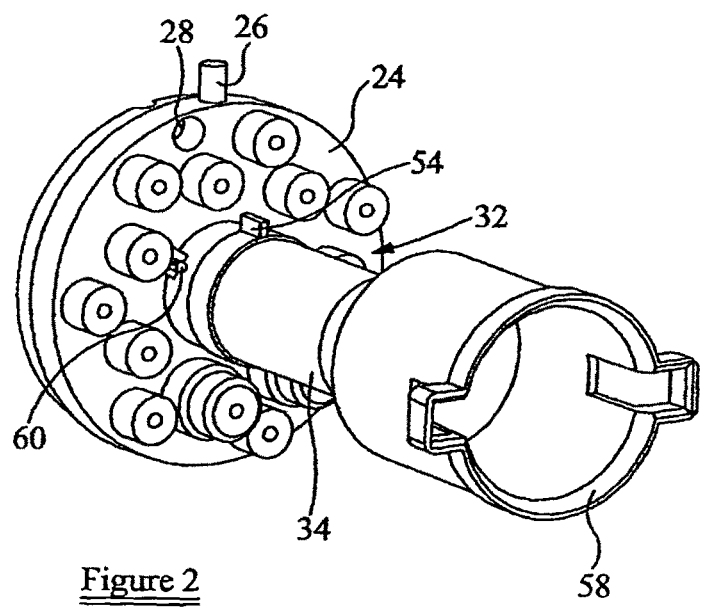
FIG. 2 is a diagrammatic view of a flying stabplate including a connection device according to an embodiment of the invention and intended for use with the fixed stabplate of FIG. 1.
Figure 3:
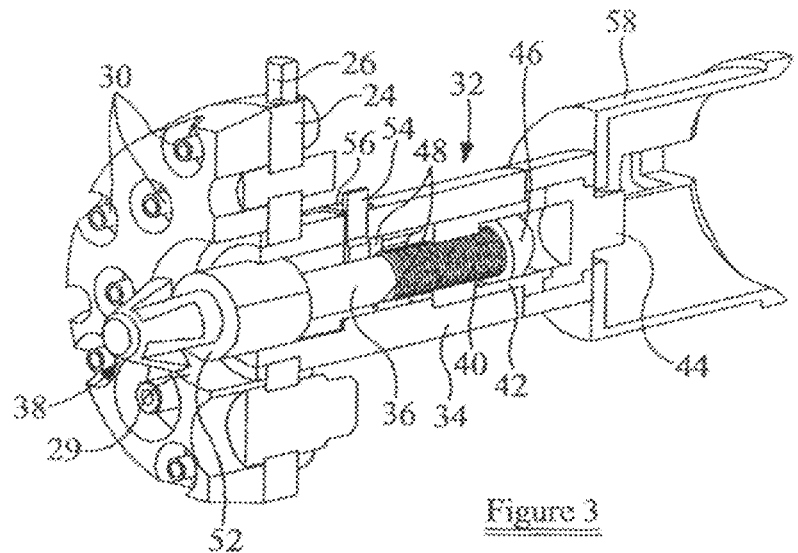
FIG. 3 is a sectional perspective view of the flying stabplate of FIG. 2.
Figure 4:
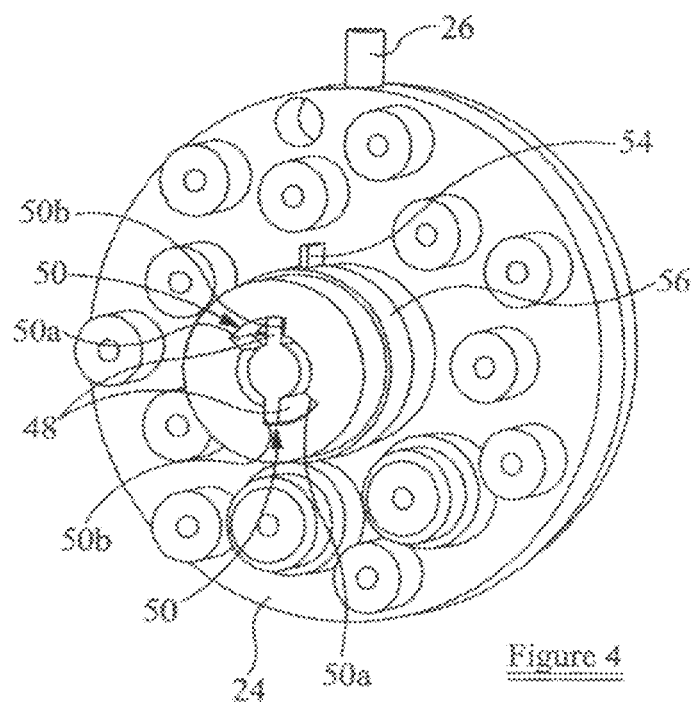
FIG. 4 is another sectional view of the flying stabplate.

FIGS. 2 to 4 illustrate a flying stabplate intended for use in conjunction with the fixed stabplate of FIG. 1. The flying stabplate shown in FIGS. 2 to 4 comprises a plate 24 of generally circular form, the diameter of the plate 24 being slightly smaller than the inner diameter of the smallest diameter part of the guidance funnel 14 such that cooperation between the periphery of the plate 24 and the guidance funnel 14 serves to guide and radially align the plate 24 with the plate 10 upon insertion of the plate 24 into the guidance funnel 14. A radially extending projection 26 extends from the periphery of the plate 24 and is receivable within the keyway slot 16 to provide course angular alignment of the plate 24 with the plate 10. The plate 24 is provided with an alignment opening 28 positioned to receive the alignment pin 18 when the plates 10, 24 are fully aligned. A recess 29 is provided in the plate 24 and arranged to receive the boss 20. When properly aligned, connectors 30 provided upon the plate 24 are accurately aligned with, and mate with, the corresponding connectors 12 provided upon the plate 10.

In use, the connectors 12 provided on the plate 10 are connected to associated electrical cables or hydraulic or chemical tubes (not shown), to permit the supply of electrical or hydraulic power or signals, or chemicals, to or from subsea located equipment. The connectors 30 provided upon the plate 24 are connected to corresponding tubes or cables (not shown), for example in the form of an umbilical, connected to surface or other remote located equipment. It will be appreciated, therefore, that the connection of the stabplates to one another permits the connection or supply of power, signals and/or chemicals between the surface or other remote location and the subsea located equipment.

In accordance with the invention a connection device 32 is provided for use in securing the stabplates to one another, the connection device 32 being secured to the flying stabplate and being cooperable, in use, with the opening 22 of the fixed stabplate. Although as illustrated the connection device is associated with the flying stabplate, arrangements in which the connection device is associated with the fixed stabplate may be possible, but this is not currently preferred. The connection device 32 comprises a tubular housing 34 of multipart form secured to the flying stabplate and within which a lock component 36 is located. The lock component 36 is able to move both axially and angularly relative to the housing 34. A projecting end part 38 of the lock component 36 which is of non-circular shape to conform with the shape of the opening 22 projects through the plate 24 so that when the plates 10, 24 are brought into close alignment with one another, the end part 38 aligns with the opening 22.

Integrally formed with, or rigidly secured to, the lock component 36 is a threaded drive region or shaft 40. A drive nut 42 is in screw threaded engagement with the drive shaft 40, the nut 42 being held captive within the housing 34 in such a manner that the nut 42 can be rotated relative to the housing 34, axial movement of the nut 42 being resisted. The nut 42 has a torque tool engagement feature 44 shaped to permit rotation of the nut, in use, using an appropriate tool (not shown) either by a diver or using an ROV. The feature 44 is surrounded by a torque receptacle 58 which provides reaction to applied torques.

A stop collar 46 is provided toward the end of the drive shaft 40, the stop collar 46 being engageable with stop surfaces provided within the nut 42 to limit axial movement of the drive shaft 40, and the lock component 36, relative to the housing 34.

The lock component 36 is further provided with a pair of radially extending ribs 48 received within arcuate recesses 50 formed in the housing 34. It will be appreciated that cooperation between the ribs 48 and stop surfaces 50a 50b formed at the edges of the recesses 50 limit angular movement of the lock component 36 relative to the housing 34.

In normal use, when it is desired to connect the flying stabplate to the fixed stabplate the drive nut 42 is rotated in the anticlockwise direction, the threaded connection between the drive nut 42 and the shaft 40 resulting in axial movement of the shaft 40 and lock component 36 with the result that the end part 38 of the lock component 36 projects through the plate 24. The axial movement of the drive shaft 40 will continue until the stop collar 46 bears against the stop surface of the nut 42. Further rotation of the nut 42 will result in limited angular movement of the lock component 36, the angular movement being limited by engagement of the ribs 48 with the associated stop surfaces 50a. This angular position of the end part 38 of the lock component 36 is referred to herein as a first angular position of the end part 38. Application of torque will serve to bind the drive nut 42 to the lock component. The flying stabplate is then introduced into the guide funnel 14 of the fixed stabplate, the alignment means in the form of the interengaging projection and keyway, and pin and opening, serving to ensure that the plates 10, 24 are correctly aligned with one another. In this orientation, the end part 38 of the lock component 36 is orientated such that it can be passed into and through the opening 22.

Once the flying stabplate has been so positioned, the drive nut 42 is rotated in the clockwise direction. The initial part of the drive nut motion results in angular movement of the lock component 36 by virtue of the nut 42 and shaft 40 being bound together as described hereinbefore. This movement continues until a second angular position is reached in which the ribs 48 abut the stop surfaces 50b. Once this position has been reached, it will be appreciated that the end part 38 of the lock component is no longer able to pass through the opening 22. It is envisaged that the lock component will move through approximately 45 degrees in moving between its first and second angular positions, but this need not always be the case and other angles are possible, particularly where the end part 38 is of other cross-sectional shapes. Continued rotation of the drive nut 42 releases the stop collar 46 from its engagement with the nut 42, and then retracts the lock component 36 with the result that the end part 38 of the lock component 36 moves into engagement with the rear surface of the boss 20, and subsequently serves to securely clamp the plates 10, 24 to one another against any separating loads applied by the connectors 12, 30.

When it is desired to release the stabplates, the drive nut 42 is driven in the anti-clockwise direction. Initially the frictional loadings within the connection device will be such that the rotation of the drive nut 42 causes axial displacement of the lock component 36 urging the end part 38 thereof away from the rear face of the boss 20. This movement also results in a face 52 of the lock component 36 abutting the front face of the boss 20, and subsequently forces the plates 10, 24 apart. The rotation of the nut 42 continues until the drive shaft 40 approaches the end of its range of movement, engaging the stop collar 46 with the end of the drive nut 42, at which point the continued movement of the drive nut 42 will cause angular displacement of the lock component 36 back to its first angular position. Such movement is limited by engagement between the ribs 48 and stop surfaces 50a. Once this position is reached, the angular orientation of the lock component 36 is once again such that it can pass through the opening 22, thereby permitting removal of the flying stabplate from the fixed stabplate. Final application of torque binds the nut 42 to the lock component 36 in readiness for reconnection.

An indicator member 54 is carried by one of the ribs 48 such as to be axially moveable along the rib 48 and angularly moveable with the rib 48, the indicator member 54 projecting through a slot formed within the housing 34, a cover 56 closing the parts of the slot not occupied by the indicator member 54 at any given time. It will be appreciated that as the indicator member 54 is angularly moveable with the lock component 36, it provides a visual indication of the angular position and/or movement of the lock component 36 which may be of assistance to an operator in the connection and separation of the stabplates.

A secondary release mechanism is provided to permit separation of the stabplates in the event of, for example, jamming or a failure in the threaded drive arrangement of the connection device. In the event of a failure or jam, a large magnitude torque can be applied via the torque engagement feature 44 and the torque receptacle 58, either by a diver or an ROV, the torque being sufficient to drive the lock component 36 to an angular position in which the end part 38 thereof can pass through the opening 22.

An alternative secondary, or third or tertiary release mechanism is also provided to permit separation in the event that both the main and secondary release mechanisms have failed. The tertiary release mechanism takes the form of a removable pin 60 which serves to resist relative angular movement between the housing 34 and the plate 24 in normal use. In the event of a failure, the pin 60 can be removed. Once the pin 60 has been removed, the application of a torque to the housing 34 or the torque bucket 58, for example using a special diver or ROV tool, results in angular movement of the entire connection device and once such movement has resulted in the end part 38 of the lock component 36 becoming appropriately aligned with the opening 22, it will be appreciated that separation of the stabplates can occur.

It will be appreciated that neither the secondary nor the tertiary release mechanisms rely upon the shearing of one or more components to permit separation.

Figure 5:
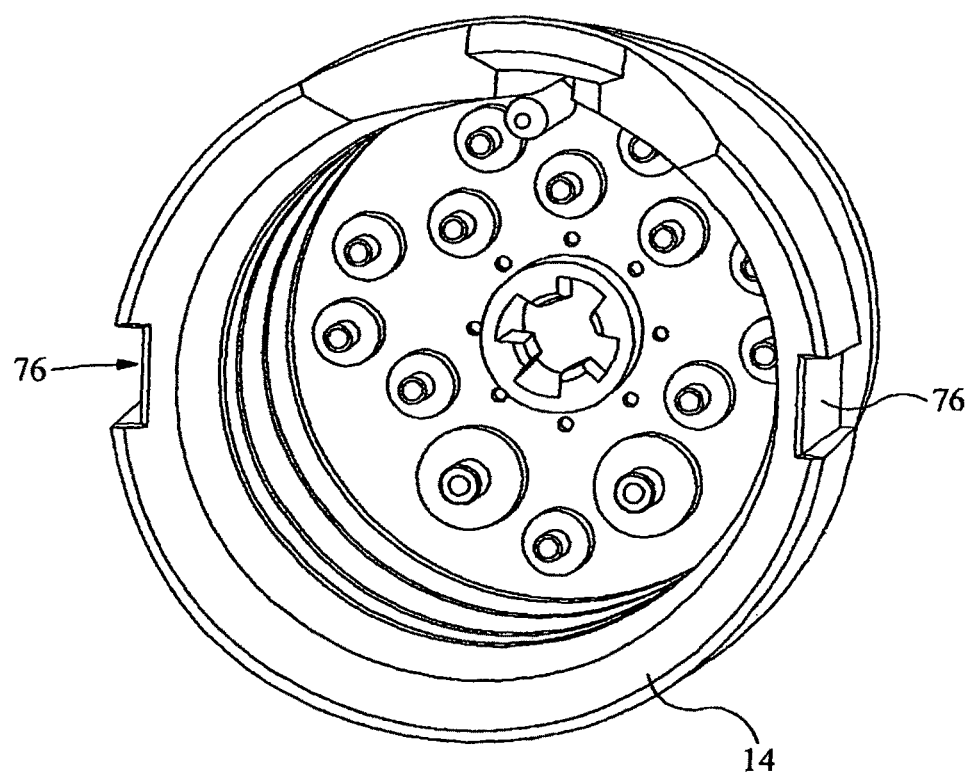
FIGS. 5 to 7 illustrate an alternative embodiment.
Figure 6:
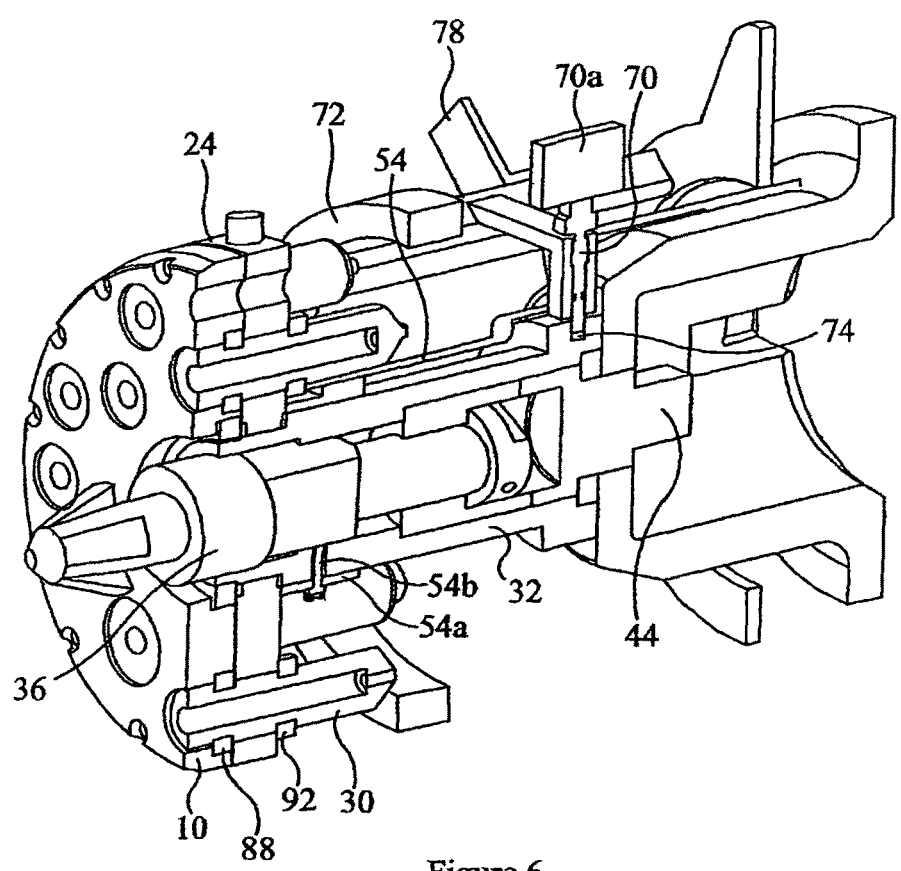
Figure 7:
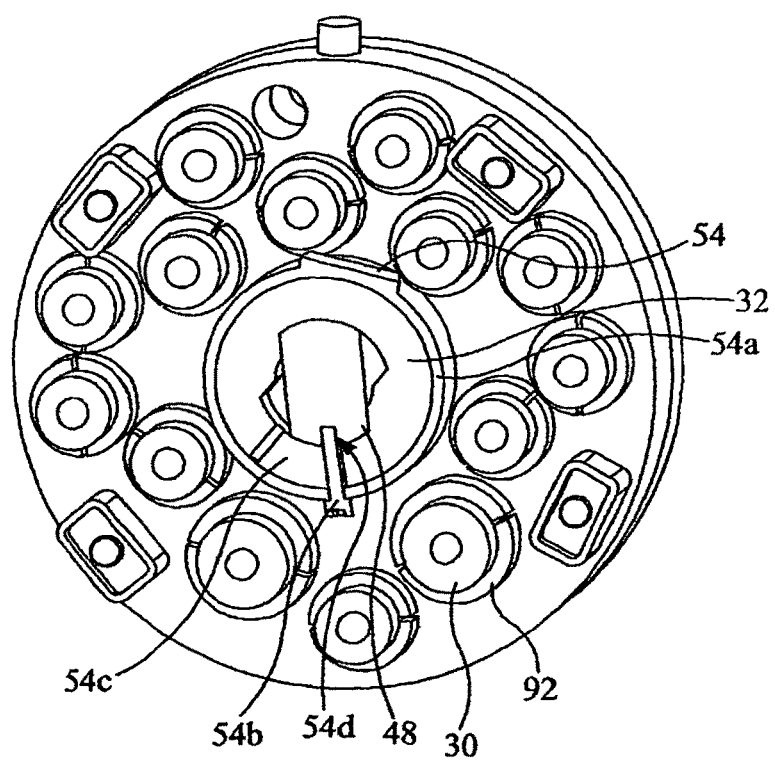

FIGS. 5 to 7 illustrate an alternative embodiment which, for the most part, is the same as or very similar to that described hereinbefore. Consequently, only the significant differences between this embodiment and the arrangement described hereinbefore will be described in detail.

In the arrangement described hereinbefore the indicator member 54 is carried by one of the ribs 48 and is exposed through a slot formed in the housing 34. In the arrangement of FIGS. 5 to 7, the indicator member 54 is mounted upon a collar 54a which surrounds part of the housing 32. A radially inwardly extending pin 54b is carried by the collar 54a, the pin 54b extending through a slot 54c formed in the housing 32, an inner end of the pin 54b being received within a slot 54d formed in one of the ribs 48. The cooperation of the end of the pin 54b in the slot 54d ensures that the collar 54a, and hence the indicator member 54, is angularly aligned with the lock component 36 and so provides an accurate indication of the angular orientation thereof, but allows axial movement of the lock component 36 relative to the collar 54a and indicator member 54. The collar 54a closes the slot 54c formed in the housing 32, thereby preventing the ingress of debris into the housing 32.

The alternative secondary, or tertiary release mechanism of the arrangement shown in FIGS. 5 to 7 differs from that described hereinbefore in that the pin 60 is omitted and instead a retractable pin 70 is provided, the pin 70 being mounted upon a support structure 72 secured to the plate 24. An inner end of the pin 70 in engageable with a recess 74 provided in the housing 32, and it will be appreciated that when the pin 70 is engaged with the recess 74, relative angular and axial movement between the housing 32 and the plate 24 is resisted. In the event that the tertiary release mechanism needs to be used to achieve release, the pin 70 is moved, angularly, using the paddle features 70a formed or provided thereon, to retract the pin 70 from the recess 74 and thereby allow angular movement of the housing 32 relative to the plate 24 to allow release of the lock component 36 and subsequent separation of the plates 10, 24. Features 76 provided on the guidance funnel 14 provide an interface for use by a special diver tool or ROV to assist in achieving such movement.

The support structure 72, in addition to serving as a mounting for the pin 70, also provides a load reaction path for unbalanced coupler loadings. Close tolerances exist between the support structure 72 and the guidance funnel 14. In order to assist in determining when the plate 24 is correctly positioned, an indicator 78 is mounted upon the support structure 72 which will be positioned in close proximity to the front edge of the guidance funnel 14 when the plate 24 is fully mated with the plate 10.

Figure 8:
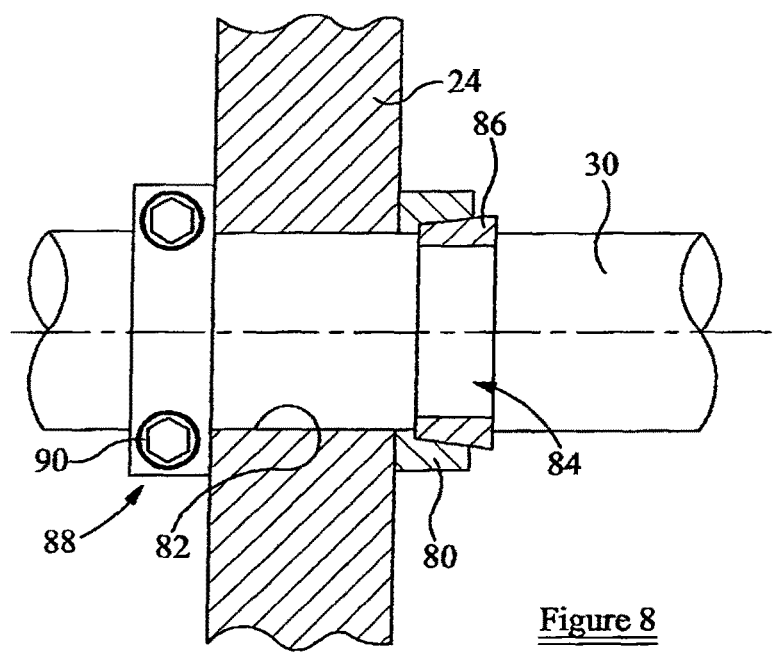
FIG. 8 illustrates an alternative design of connector suitable for use with the stabplate.

It is desirable for the connectors 30 to be designed in such a manner as to permit securing to the plate 24 by offering the connector 30 to the plate 24 from either side thereof, and FIG. 8 illustrates a connector 30 in which this is possible. In the arrangement shown in FIG. 8 the plate 24 includes an internally tapering collar 80 aligned with an opening 82 through which the connector 30 is to extend, in use. The connector 30 is provided with a groove or recess 84. In use, the connector 30 is offered up to the plate 24 and a set of wedge shaped collets 86 is positioned within the groove 84. The set of collets 86 is then introduced into the collar 80. The cooperation between the set of collets 86 and the collar 80 limits axial movement of the connector 30. A clamp 88 is secured, by fixings 90, to the part of the connector 30 adjacent the opposite side of the plate 24, fixing the connector 30 in position. The clamp 88 is conveniently fitted, partially, into a corresponding groove formed in the connector 30. It will be appreciated that, with such an arrangement, the connector 30 can be inserted into the opening 82 from either the front or the rear of the plate 24, thereby assisting in assembly.

An alternative assembly for securing the connectors 30 in position is shown in FIGS. 6 and 7 in which the set of collets 86 and collar 80 are replaced by a split clamp 92 provided in a groove in the connector 30.

The description hereinbefore is of one embodiment of the invention. It will be understood that a wide range of modifications and alterations may be made thereto without departing from the scope of the invention.

The invention claimed is:

1. A connection device comprising a lock component of non-circular cross-sectional shape, the lock component being both angularly and axially moveable relative to a housing, stop means operable to limit angular movement of the lock component relative to the housing, the lock component having a threaded drive region, and a drive nut in threaded engagement with the drive region, wherein angular movement of the drive nut relative to the housing when the stop means are not engaged is able to drive the lock component for angular movement without causing axial displacement of the lock component relative to the housing, rotation of the drive nut when the stop means are engaged causing axial displacement of the lock component relative to the housing.

2. A connection device according to claim 1, further comprising indicator means to indicate the angular position of the lock component relative to the housing.

3. A connection device according to claim 1, further comprising a secondary release means.

4. A connection device according to claim 3, wherein the secondary release means comprises auxiliary drive means for applying an increased torque to force angular movement of the lock component and thereby permit release of the connection device.

5. A connection device according to claim 4, wherein the auxiliary drive means comprises a torque bucket.

6. A connection device according to claim 1, further comprising an alternative secondary release means.

7. A connection device according to claim 6, wherein the alternative secondary release means is operable to permit angular movement of the housing of the connection device relative to a stabplate.

8. A connection device according to claim 7, wherein the alternative secondary release means comprises a retractable lock member, removal or retraction of which permits relative movement to take place between the housing and the stabplate.

9. A stabplate arrangement comprising a first stabplate having a non-circular socket associated therewith, and a second stabplate having a connection device as claimed in claim 1 associated therewith, a part of the lock component of the connection device being able to pass through or into the socket in a first angular orientation, angular movement of the lock component to a second angular orientation preventing such movement.

10. An arrangement according to claim 9, wherein alignment means are provided to ensure the correct alignment of the stabplates, in use.

11. An arrangement according to claim 10, wherein the alignment means comprises a radial projection associated with one of the stabplates receivable within a corresponding keyway associated with the other of the stabplates.

12. An arrangement according to claim 10, wherein the alignment means comprises a pin which extends in a direction parallel to the axis of one of the stabplates receivable within a corresponding opening or recess formed in the other of the stabplates.

13. An arrangement according to claim 9, further comprising separation means for urging the stabplates apart.

14. A stabplate arrangement comprising: a first stabplate having a non-circular socket associated therewith, and
    a second stabplate having a connection device comprising a lock component of non-circular cross-sectional shape, the lock component being both angularly and axially moveable relative to a housing, stop means operable to limit angular movement of the lock component relative to the housing, the lock component having a threaded drive region, and a drive nut in threaded engagement with the drive region, wherein angular movement of the drive nut relative to the housing when the stop means are not engaged is able to drive the lock component for angular movement, rotation of the drive nut when the stop means are engaged causing axial displacement of the lock component relative to the housing,
including a part of the lock component of the connection device being able to pass through or into the socket in a first angular orientation, angular movement of the lock component to a second angular orientation preventing such movement;
further comprising separation means for urging the stabplates apart,
wherein the separation means comprise a surface of the lock component engageable with an outer surface of the first stabplate, release of the connection device forcing the said surface of the lock component against the first stabplate and urging the stabplates apart.

* * * * *